United States Patent [19]

Brennecke et al.

[11] Patent Number: 4,813,985

[45] Date of Patent: * Mar. 21, 1989

[54] TENSIONING DEVICE FOR BAG FILTERS

[75] Inventors: James H. Brennecke, Kansas City; Robert E. Mace, Raytown, both of Mo.

[73] Assignee: BHA Group, Inc., Kansas City, Mo.

[*] Notice: The portion of the term of this patent subsequent to Jul. 1, 2003 has been disclaimed.

[21] Appl. No.: 14,826

[22] Filed: Feb. 13, 1987

Related U.S. Application Data

[63] Continuation-in-part of Ser. No. 782,124, Sep. 30, 1985, Pat. No. 4,671,812, which is a continuation of Ser. No. 630,668, Jul. 13, 1984, abandoned.

[51] Int. Cl.$^4$ .............................................. B01D 46/00
[52] U.S. Cl. ...................................................... 55/378
[58] Field of Search ................................. 55/378, 379

[56] References Cited

U.S. PATENT DOCUMENTS

| | | | |
|---|---|---|---|
| 3,881,673 | 5/1975 | Peterson | 248/94 |
| 4,217,117 | 8/1980 | Syverson | 55/304 |
| 4,364,758 | 12/1980 | Clements et al. | 55/365 |
| 4,396,408 | 8/1983 | Mace | 55/378 |
| 4,400,186 | 8/1983 | Leunig et al. | 55/379 |
| 4,436,536 | 3/1984 | Robinson | 55/341 R |
| 4,595,402 | 6/1986 | Silletto et al. | 55/378 |
| 4,597,783 | 7/1986 | Brennecke et al. | 55/378 |
| 4,671,812 | 6/1987 | Brennecke et al. | 55/378 |

FOREIGN PATENT DOCUMENTS

| | | |
|---|---|---|
| 183946 | 4/1907 | Fed. Rep. of Germany . |
| 3233750 | 3/1984 | Fed. Rep. of Germany . |

*Primary Examiner*—Bernard Nozick
*Attorney, Agent, or Firm*—Kokjer, Kircher, Bradley, Wharton, Bowman & Johnson

[57] ABSTRACT

For an inside to outside dust collector, a self tensioning device for bag filters for connecting the upper end of a fabric sleeve filter to an overhead support. The device includes a modified double draw bar spring assembly interposed between the overhead support of the baghouse and the upper end of the bag filter. Prior to installation, the spring is compressed and captured by a retainer member. After installation, the retainer member may be removed and the spring flexed to appropriately tension the filter sleeve and to permit controlled flexure during cycling from a filtering to a cleaning operation.

13 Claims, 5 Drawing Sheets

TENSIONING DEVICE FOR BAG FILTERS

BACKGROUND AND SUMMARY OF THE INVENTION

This application is a continuation-in-part of our co-pending application Ser. No. 782,124, filed Sep. 30, 1985 now U.S. Pat. No. 4,671,812 and entitled "Tensioning Device for Bag Filters," which is a continuation application of Ser. No. 630,668, filed July 13, 1984 and entitled "Tensioning Device for Bag Filters", now abandoned.

This invention relates to industrial baghouses and, more particularly, to a tensioning device for connecting cylindrical bag filters to an overhead support.

Continuous emphasis on environmental quality has resulted in increasingly strenuous regulatory controls on industrial emissions. One technique which has proven highly effective in controlling air pollution has been separation of undesirable particulate matter from a gas stream by fabric filtration. Such filtration is carried out in dust collection apparatus known in the trade as a "baghouse" which operates on the same general principle as an ordinary household vacuum cleaner, except on a much larger scale. Basically, the baghouse is a sheet metal housing divided into two chambers, referred to as plenums, by a tube sheet. Disposed within openings in the tube sheet are fabric filters. A particulate laden gas stream induced by the action of a fan, blows into one chamber (dirty air plenum) wherein dust accumulates on the fabric filter as the gas passes through the fabric into the other plenum (clean air plenum) and out an exhaust. Although all baghouses are designed in accordance with the foregoing general principles, there are numerous operational and structural distinctions. The present invention relates to a baghouse wherein a plurality of cylindrical filter bags having closed upper ends are vertically suspended in the clean air plenum from a bag support framework. The lower ends of the bags are fixed to openings in a tube sheet or cell plate. Filtration of the process gas occurs from inside to outside of the bags (i.e., the dust collects on the inside surface of each bag). As a result, baghouses constructed in this manner are normally referred to as inside-to-outside bag collectors.

During continuous operation of the baghouse the bags must be periodically cleaned to remove the dust cake which accumulates within each filter sleeve. This may be done by interrupting the flow of the process gas carrying particulate matter and then causing reverse cleaning air to flow from the clean air plenum to the dirty air plenum. The reverse flow of cleaning air causes the dust cake to be dislodged and fall through the interior of the bag to the dirty air plenum for removal by an auger or similar means. In some baghouse installations, reverse air cleaning may also be supplemented with mechanical shaking of the filters.

The air cleaning process reverses the pressure drop the fabric filter normally experiences during filtering operation. In other words, the filter sleeve tends to collapse inwardly when being cleaned. This tendency is limited somewhat by circular support rings sewn to the outside of the bag at spaced intervals along its length.

Proper tensioning of the bags plays an important role in eliminating fabric collapse during the cleaning and filtering process. If the bags are stretched too tightly between the support framework and the cell plate, the bags do not collapse during cleaning, but they tend to wear out quickly. If, on the other hand, the bags are installed too loosely then the fabric between adjacent skeletal support rings collapses during cleaning and will not permit the dust cake to fall through the bag to the bottom of the dirty air plenum.

Even when a filter bag is properly installed and tensioned correctly, it is reasonable to expect the fabric to stretch with age and with repeated cyclings between the filtering and cleaning modes of operation. Thus, the bags must be periodically checked and the tension readjusted for each bag from time to time.

The installation and maintenance of filter bags of this genre has traditionally been a time consuming and costly operation. Accordingly, there has been a long felt need in this industry for improvements in filter bag assemblies and mounting techniques to alleviate the many installation and maintenance difficulties which have been encountered.

An earlier solution for properly tensioning filter bags is found in U.S. Pat. No. 4,364,758 of Clements et al issued Dec. 21, 1982 and entitled "Self Tensioning Cap for Bag Filters". This patent is incorporated herein by reference and is generally illustrative of the environment of the instant invention. In cited U.S. Pat. No. 4,364,758, the tensioning feature requires a rigid closure cap which closes the upper end of the fabric filter. Interiorly of the filter bag (i.e., below the cap itself) a tensioning spring is carried on a support rod. When the support rod is mounted on the bag support framework, the tensioning spring acts against the cap and pushes it upwardly relative to the end of the support rod to thus tension the bag. Adjustment may be achieved by supporting the retainer rod through one of a plurality of holes in the support rod by means of a removable pin which acts against the upper surface of the support framework. It is also contemplated in this earlier patent that the tensioning spring can be compressed between the closure cap and the support rod and captured by means of a removable pin. Thus, after installation, the capture pin may be removed to permit the spring to act on the cap and tension the bag.

Application of the foregoing prior art technique is limited, however, to specific baghouse configurations provided sufficient overhead room above the bag support framework to permit both the initial installation and subsequent adjustment of the tensioning assembly. Further, this earlier arrangement placed the flexing components of the tensioning device on the process gas side of the filtering operation which, in some process applications, subjected the flexing members to a rather corrosive environment.

Accordingly, a need remains in the industry for a broad application tensioning device to be employed in a greater range of baghouse configurations. The primary goal of this invention is to fulfill this need.

More specifically, a goal of the invention is to provide a filter bag tensioning device universally adaptable to various baghouse configruations without the need of structural changes within the baghouse.

Another object of the invention is to provide a tensioning device achieving the advantages of accurately pretensioning the filter bags for installation in baghouses having highly limited access above the bag support framework.

An additional object of the invention is to provide a tensioning device of the character described and adapted to baghouse installations wherein limited distance is available between the end of the filter bag and the bag support framework.

Yet another object of the invention is to provide a tensioning device of the character described which may be utilized with filter sleeves having a wide range of end closure configurations.

A further object is to provide a tensioning device which will function with a broad range of configurations of the overhead framework within the baghouse.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE DRAWINGS

The various views of the various embodiments of the invention will be understood by those skilled in art to be located within the upper region of the clean air plenum of a baghouse. The overall environment in which the present invention is installed is schematically illustrated in U.S. Pat. No. 4,364,758, incorporated by reference, and particularly shown in FIG. 1 of said patent.

Figure 1:
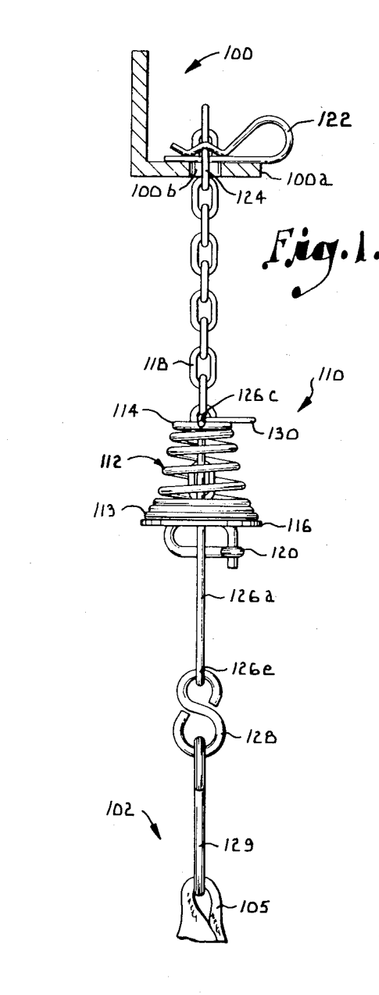
FIG. 1 is a side elevational view of a tensioning device interconnecting the upper end of a filter sleeve with the overhead support framework of a baghouse illustrating a first embodiment of the invention.
Figures 2, 3, 4, 5:
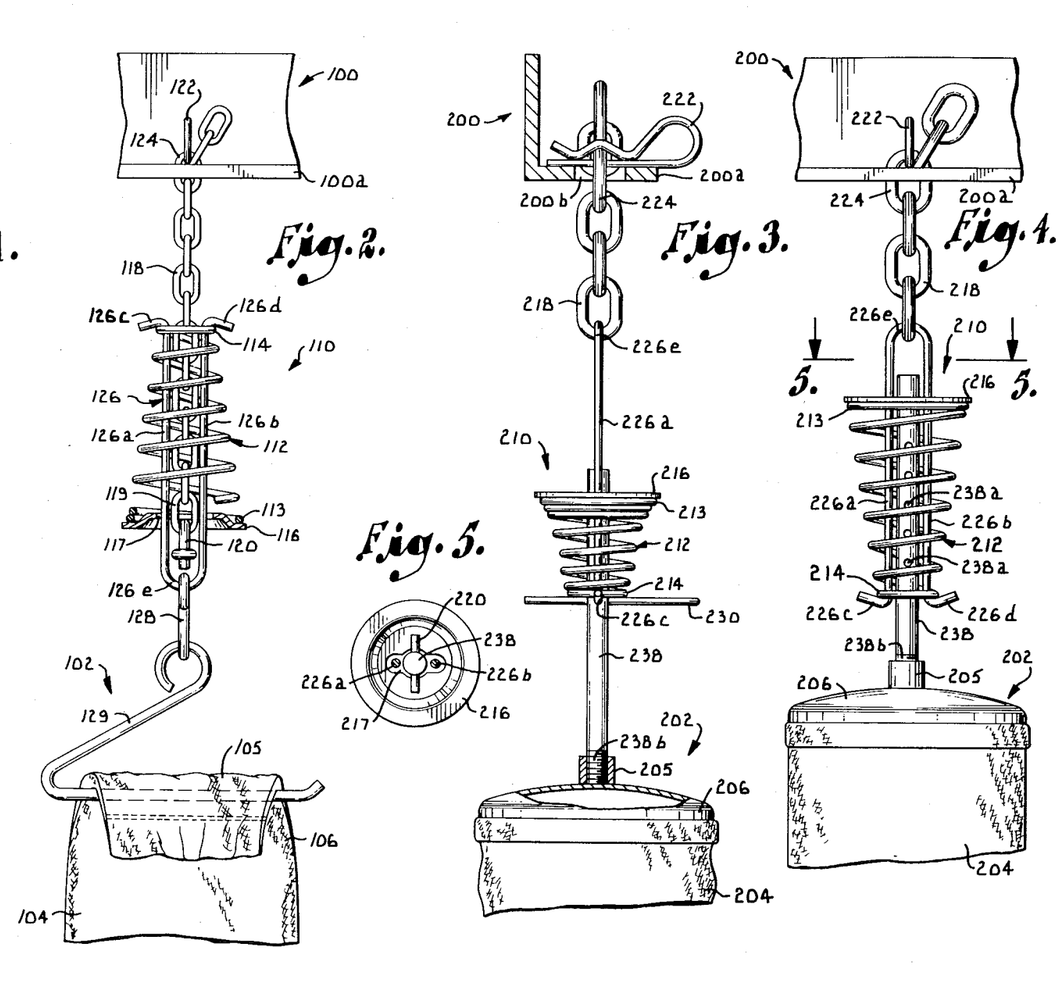
FIG. 2 is a side elevational view taken 90° to the FIG. 1 view and with the retaining spring released to pull taut the fabric filter sleeve.
FIG. 3 is a side elevational view of a second embodiment of the invention.
FIG. 4 is a side elevational view taken 90° from the FIG. 3 view and with the retaining spring released to pull taut the fabric filter sleeve.
FIG. 5 is a top plan view of the spring tensioning device taken along line 5—5 of FIG. 4 in the direction of the arrows to better illustrate the details of construction.

Referring to the first embodiment of the invention shown in FIGS. 1 and 2, within the upper region of the clean air plenum is mounted a bag support framework which, as shown, may be constructed of angle iron members 100. The bag support framework can similarly be constructed of C-shaped channels, H beams, flat irons, and, in fact, most any structural element sufficient to form a sturdy framework for supporting a plurality of bags within the baghouse. The horizontal leg 100a of the angle iron support 100 includes an opening 100b therethrough used for connecting a filter bag to the framework. The bag support framework may additionally be equipped with mechanical shaking apparatus (not shown) as is known to be conventional in this art to assist in the cleaning operation.

Mounted within the clean air plenum are a plurality of filter assemblies, the upper end of one such filter assembly 102 is shown in FIGS. 1 and 2. The lower end of the filter sleeve 104 is securely fixed to a cell plate separating the dirty and clean air plenums. Particulate laden process gas may thus flow from the dirty air plenum, through the cell plate to the interior of the filter sleeve 104.

As illustrated in FIGS. 1 and 2, a spring tensioning assembly 110 is interposed in the connecting linkage between the top of the filter assembly 102 and the overhead support structure 100 characteristically found in a baghouse. Focusing first on the spring tensioning assembly 110 itself, there is included a conical spring 112 having a greater diameter end 113 and a progressively lesser diameter, opposite end 114. Contacting the greater diameter end 113 of the conical spring 112 is a retainer washer 116 which forms a first spring biasing surface. The retainer washer 116 is of the same form as illustrated in FIG. 5 and includes a central slot 117 therethrough. A support chain 118 extends centrally through the conical spring 112 and one terminal link 119 of the chain 118 passes through the slot 117 in the retainer washer 116 which receives a cross bolt or keeper link 120.

The support chain 118 passes upwardly from the retainer washer 116 centrally through the conical spring 112 and through the opening 100b in the overhead support 100a where it is secured by a hitch pin clip 122 passed through one link (i.e., link 124) of the chain 118.

Thus, the chain 118, washer 116, keeper link 120, and pin clip 122 cooperate to provide a frame-to-spring support means interconnecting the spring 112 to the overhead support structure 100.

Also extending centrally through the conical spring 112, on the outside of the support chain 118, is a draw bar 126. The draw bar 126 is in the form of a U-shaped member having legs 126a and 126b which pass upwardly through the slot 117 in the retainer washer 116 and which terminate in outwardly extending ears 126c and 126d which overlie the lesser diameter end 114 of the conical spring 112 to provide a second spring biasing surface. The bight end 126e of the draw bar 126 carries a chain or S-hook 128 connected to a hanger 129 which receives the fabric loop 105 of the filter sleeve 104 having a tapered upper end 106 well known to those in this industry.

Thus, the draw bar 126, S-hook 128, and hanger 129 cooperate to provide a bag-to-spring support means interconnecting the upper end 106 of the filter to the spring 112.

In the pretensioned condition of the spring assembly 110 illustrated in FIG. 1, prior to completed installation of the filter assembly, the conical spring 112 is compressed between the first and second spring biasing surfaces provided respectively by the retainer washer 116 and the ears 126c and 126d of the draw bar 126. The conical spring 112 is captured in the foregoing position by a hitch pin clip 130 through one of the links of support chain 118 to retainingly engage the lesser diameter end 114 of the spring 112.

In operation, the lower end of the filter sleeve 104 is secured in a conventional manner to the cell plate in the bottom region of the baghouse. The upper end of the filter sleeve is connected to the spring tensioning assembly 110 as indicated with the conical spring 112 captured between the first and second spring biasing surfaces. The tag end of the support chain 118 is inserted through the opening 100b in the overhead support 100A and the clip 122 is installed through a link 124 of the chain to suspend the entire filter assembly 102 from the support structure in a pretensioned condition. The pin clip 130 is then removed from the chain 118 to release the conical spring 112. The spring 118 acts against the retainer washer 116 and the ears 126c and 126d of the draw bar 126 to provide opposing forces to spread apart the first and second spring biasing surfaces and, thus, to tension the filter sleeve 104 as appropriate to complete installation as illustrated in FIG. 2.

Referring to the second embodiment of the invention shown in FIGS. 3-5, within the upper region of the clean air plenum is mounted a bag support framework which, as shown, may be constructed of angle iron members 200. The horizontal leg 200a of the angle iron support 200 includes an opening 200b therethrough used for connecting a filter bag to the framework.

Mounted within the clean air plenum are a plurality of filter assemblies, the upper end of one such filter assembly 202 is shown in FIGS. 3 and 4. The lower end of the filter sleeve 204 is securely fixed to a cell plate separating the dirty and clean air plenums. Particulate laden process gas may thus flow from the dirty air plenum, through the cell plate to the interior of the filter sleeve 204.

As illustrated in FIGS. 3 and 4, a spring tensioning assembly 210 is interposed in the connecting linkage between the top of the filter assembly 202 and the overhead support structure 200 characteristically found in a baghouse. Focusing first on the spring tensioning assembly 210 itself, there is included a conical spring 212 having a greater diameter end 213 and a progressively lesser diameter, opposite end 214. Contacting the greater diameter end 213 of the conical spring 212 is a retainer washer 216 which forms a first spring biasing surface. The retainer washer 216 is illustrated in FIG. 5 and includes a central slot 217 therethrough. A support rod 238 having a plurality of lateral holes 238a therethrough extends centrally through the conical spring 212. One end of the rod 238 passes through the slot 217 in the retainer washer 216 and a rolled pin 220 is inserted in the outermost hole 238a of the rod 238 (FIG. 5).

Also extending centrally through the conical spring 212, on the outside of the support rod 238, is a draw bar 226. The draw bar 226 is in the form of a U-shaped member having legs 226a and 226b which pass through the slot 217 in the retainer washer 216 and which terminate in outwardly extending ears 226c and 226d which overlie the lesser diameter end 214 of the conical spring 212 to provide a second spring biasing surface. A support chain 218 extends upwardly from the bight 226e of the draw bar 226 and through the opening 200b in the overhead support 200a where it is secured by a hitch pin clip 222 passed through one link (i.e., link 224) of the chain 218.

The lower threaded end 238b of the support rod 238 is received by a female threaded coupler 205 fixed to a rigid end closure cap 206. Alternatively, the threaded end of the support rod may penetrate a hole in the cap 206 and be secured interiorly thereof by a nut or the like. The uppermost end of the filter sleeve is secured to the cap 206 in a manner commonly known in this art.

Thus, the rod 238, washer 216, and pin 220 cooperate to provide a bag-to-spring support means interconnecting the spring 212 to the filter assembly 202. Moreover, the draw bar 226, chain 218, and pin 222 cooperate to provide a frame-to-spring support means interconnecting the spring 212 to the overhead support structure 200.

In the pretensioned condition of the spring assembly 210 illustrated in FIG. 3, prior to completed installation of the filter assembly, the conical spring 212 is compressed between the first and second spring biasing surfaces provided respectively by the retainer washer 216 and the ears 226c and 226d of the draw bar 226. The conical spring 212 is captured in the foregoing position by a hitch pin clip 230 through one of the holes 238a of support rod 238 to retainingly engage the lesser diameter end 214 of the spring 212.

In operation, the lower end of the filter sleeve 204 is secured in a conventional manner to the cell plate in the bottom region of the baghouse. The upper end of the filter sleeve is connected to the spring tensioning assembly 210 as indicated with the conical spring 212 captured between the first and second spring biasing surfaces. The tag end of the support chain 218 is inserted through the opening 200b in the overhead support 200a and the clip 222 is installed through a link 224 of the chain to suspend the entire filter assembly 202 from the support structure in a pretensioned condition. The pin clip 230 is then removed from the rod 238 to release the conical spring 212. The spring 212 acts against the retainer washer 216 and the ears 226c and 226d of the draw bar 226 to provide opposing forces to spread apart the first and second spring biasing surfaces and, thus, to tension the filter sleeve 204 as appropriate to complete installation as illustrated in FIG. 4.

Figure 6:
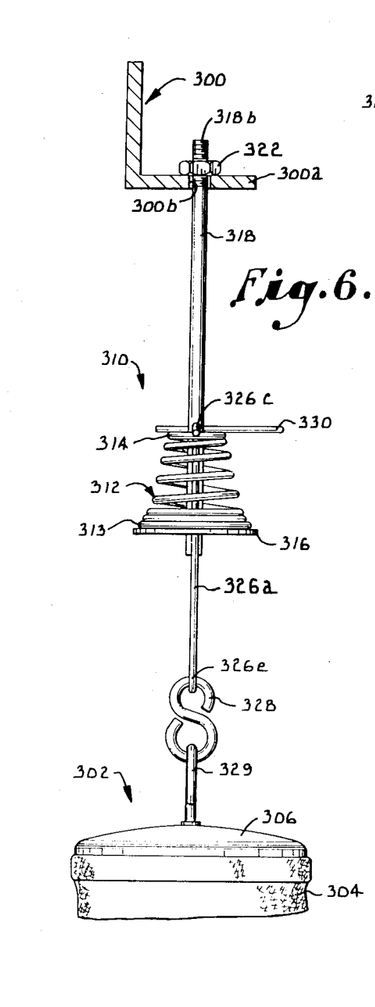
FIG. 6 is a side elevational view of a third embodiment of the invention.
Figure 7:
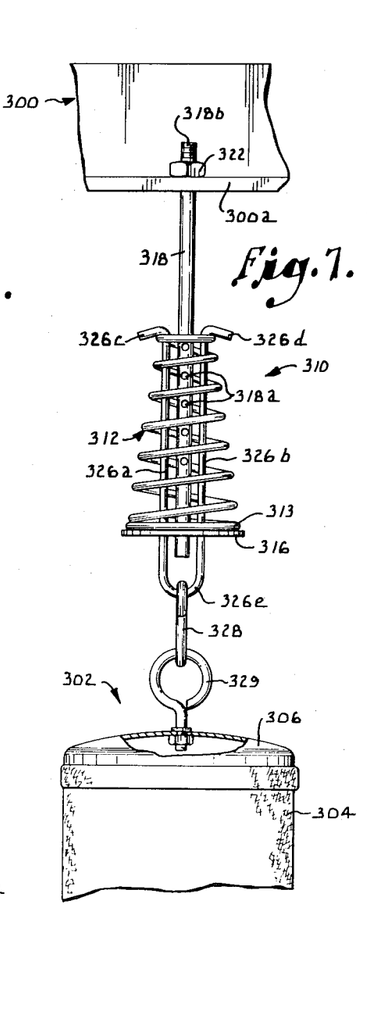
FIG. 7 is a side elevational view taken 90° from the view in FIG. 6 and with the retaining spring released to pull taut the fabric filter sleeve.

Referring to the third embodiment of the invention shown in FIGS. 6 and 7, within the upper region of the clean air plenum is mounted a bag support framework which, as shown, may be constructed of angle iron members 300. The horizontal leg 300a of the angle iron support 300 includes an opening 300b therethrough used for connecting a filter bag to the framework.

Mounted within the clean air plenum are a plurality of filter assemblies, the upper end of one such filter assembly 302 is shown in FIGS. 6 and 7. The lower end of the filter sleeve 304 is securely fixed to a cell plate separating the dirty and clean air plenums. Particulate laden process gas may thus flow from the dirty air plenum, through the cell plate to the interior of the filter sleeve 304.

As illustrated in FIGS. 6 and 7, a spring tensioning assembly 310 is interposed in the connecting linkage between the top of the filter assembly 302 and the overhead support structure 300 characteristically found in a baghouse. Focusing first on the spring tensioning assembly 310 itself, there is included a conical spring 312 having a greater diameter end 313 and a progressively lesser diameter, opposite end 314. Contacting the greater diameter end 313 of the conical spring 312 is a retainer washer 316 which forms a first spring biasing surface. The retainer washer 316 is of the same form as generally illustrated in FIG. 5 and includes a central slot therethrough. A support rod 318 having a plurality of lateral holes 318a therethrough extends centrally through the conical spring 312. One end of the rod 318 passes through the central slot in the retainer washer 316 and a rolled pin (not shown) is inserted in the outermost hole 318a of the rod 318 as a keeper.

The support rod 318 passes upwardly from the retainer washer 316 centrally through the conical spring 312 and through the opening 300b in the overhead support 300a where it is secured by a nut 322 on the threaded upper end 318b of the rod 318. Alternatively, a speed nut or friction grippers may be used to connect the upper end of the rod 318 to the support frame 300.

Thus, the rod 318, washer 316, and nut 322 cooperate to provide a frame-to-spring support means interconnecting the spring 312 to the overhead support structure 300.

Also extending centrally through the conical spring 312, on the outside of the support rod 318, is a draw bar 326. The draw bar 326 is in the form of a U-shaped member having legs 326a and 326b which pass upwardly through the central slot in the retainer washer 316 and which terminate in outwardly extending ears 326c and 326d which overlie the lesser diameter end 314 of the conical spring 312 to provide a second spring biasing surface. The bight end 326e of the draw bar 326 carries an S-hook 328 which is coupled to an eye-bolt 329 or hook connected to the rigid, end closure cap 306. The cap 306 carries the filter sleeve 304 in a manner common and well known to the industry.

Thus, the draw bar 326, S-hook 328, and eye-bolt 329 cooperate to provide a bag-to-spring support means interconnecting the filter assembly 302 to the spring 312.

In the pretensioned condition of the spring assembly 310 illustrated in FIG. 6, prior to completed installation of the filter assembly, the conical spring 312 is compressed between the first and second spring biasing surfaces provided respectively by the retainer washer 316 and the ears 326c and 326d of the draw bar 326. The conical spring 312 is captured in the foregoing position by a hitch pin clip 330 through one of the holes 318a of support rod 318 to retainingly engage the lesser diameter end 314 of the spring 312.

In operation, the lower end of the filter sleeve 304 is secured in a conventional manner to the cell plate in the bottom region of the baghouse. The upper end of the filter sleeve is connected to the spring tensioning assembly 310 as indicated with the conical spring 312 captured between the first and second spring biasing surfaces. The upper end of the support rod 318 is inserted through the opening 300b in the overhead support 300a and secured to suspend the entire filter assembly 302 from the support structure in a pretensioned condition. The pin clip 330 is then removed from the rod 318 to release the conical spring 312. The spring 312 acts against the retainer washer 316 and the ears 326c and 326d of the draw bar 326 to provide opposing forces to spread apart the first and second spring biasing surfaces and, thus, to tension the filter sleeve 304 as appropriate to complete installation as illustrated in FIG. 7.

Figure 8:
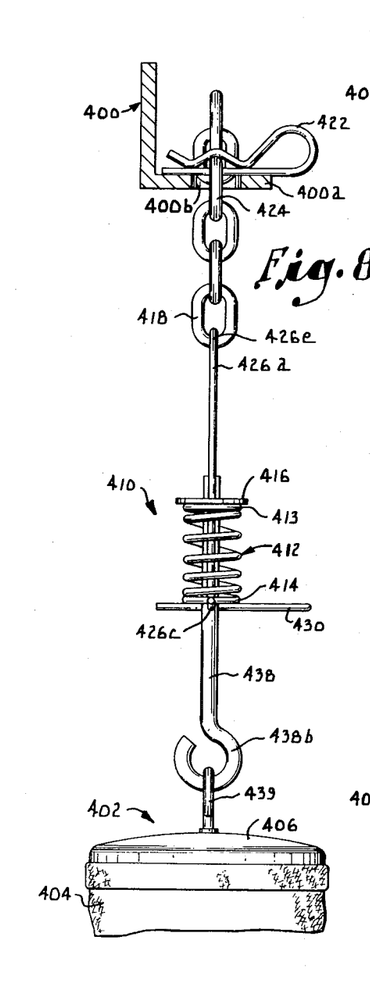
FIG. 8 is a side elevational view of a fourth embodiment of the invention.
Figure 9:
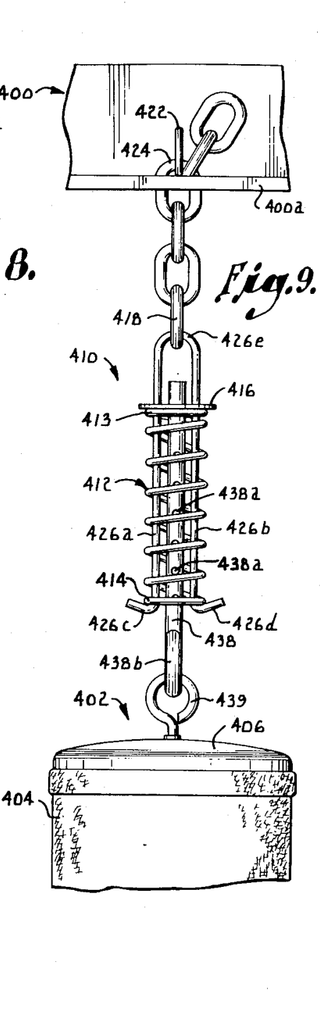
FIG. 9 is a side elevational view taken 90° from the view of FIG. 8 and with the retaining spring released to pull taut the fabric filter sleeve.

Referring to the fourth embodiment of the invention shown in FIGS. 8 and 9, within the upper region of the clean air plenum is mounted a bag support framework which, as shown, may be constructed of angle iron members 400. The horizontal leg 400a of the angle iron support 400 includes an opening 400b therethrough used for connecting a filter bag to the framework.

Mounted within the clean air plenum are a plurality of filter assemblies, the upper end of one such filter assembly 402 is shown in FIGS. 8 and 9. The lower end of the filter sleeve 404 is securely fixed to a cell plate separating the dirty and clean air plenums. Particulate laden process gas may thus flow from the dirty air plenum, through the cell plate to the interior of the filter sleeve 404.

As illustrated in FIGS. 8 and 9, a spring tensioning assembly 410 is interposed in the connecting linkage between the top of the filter assembly 402 and the overhead support structure 400 characteristically found in a baghouse. Focusing first on the spring tensioning assembly 410 itself, there is included a uniform spring 412 having an upper end 413 and a lower, opposite end 414. Alternatively, the spring 412 may be configured as an hourglass, barrel or variable-pitch spring. Contacting the upper end 413 of the spring 412 is a retainer washer 416 which forms a first spring biasing surface. The retainer washer 416 is of the same general form as illustrated in FIG. 5 and includes a central slot therethrough. A support rod 438 having a plurality of lateral holes 438a therethrough extends centrally through the conical spring 412. One end of the rod 438 passes through the central slot in the retainer washer 416 and a rolled pin (not shown) is inserted in the outermost hole 438a of the rod 438.

Also extending centrally through the spring 412, on the outside of the support rod 438, is a draw bar 426. The draw bar 426 is in the form of a U-shaped member having legs 426a and 426b which pass through the central slot in the retainer washer 416 and which terminate in outwardly extending ears 426c and 426d which overlie the lower end 414 of the spring 412 to provide a second spring biasing surface. A support chain 418 extends upwardly from the bight 426e of the draw bar 426 and through the opening 400b in the overhead support 400a where it is secured by a hitch pin clip 422 passed through one line (i.e., link 424) of the chain 418.

The open eye-bolt end 438b of the support rod 438 is coupled to an eye-bolt 429 or hook connected to the rigid, end closure cap 406. The uppermost end of the filter sleeve is secured to the cap 406 in a manner commonly known in this art.

Thus, the rod 438 and washer 416 cooperate to provide a bag-to-spring support means interconnecting the spring 412 to the filter assembly 402. Moreover, the draw bar 426, chain 418, and pin 422 cooperate to provide a frame-to-spring support means interconnecting the spring 412 to the overhead support structure 400.

In the pretensioned condition of the spring assembly 410 illustrated in FIG. 8, prior to completed installation of the filter assembly, the uniform spring 412 is compressed between the first and second spring biasing surfaces provided respectively by the retainer washer 416 and the ears 426c and 426d of the draw bar 426. The spring 412 is captured in the foregoing position by a hitch pin clip 430 through one of the holes 438a of support rod 438 to retainingly engage the lower end 414 of the spring 412.

In operation, the lower end of the filter sleeve 404 is secured in a conventional manner to the cell plate in the bottom region of the baghouse. The upper end of the filter sleeve is connected to the spring tensioning assembly 410 as indicated with the uniform spring 412 captured between the first and second spring biasing surfaces. The tag end of the support chain 418 is inserted through the opening 400b in the overhead support 400a and the clip 422 is installed through a link 424 of the chain to suspend the entire filter assembly 402 from the support structure in a pretensioned condition. The pin clip 430 is then removed from the rod 438 to release the spring 412. The spring 412 acts against the retainer washer 416 and the ears 426c and 426d of the draw bar 426 to provide opposing forces to spread apart the first and second spring biasing surfaces and, thus, to tension the filter sleeve 404 as appropriate to complete installation as illustrated in FIG. 9.

The foregoing embodiments represent broad application in the baghouse arts of the principles of this invention. A wide variety of connections may be utilized in supporting the spring assembly herein from the overhead support framework. Likewise, a wide variety of connections may be utilized for connecting the spring assembly to the filter itself. Either of the two foregoing connections may have take-up adjustment for ease of installation. In addition, the various assemblies can be reversed depending upon the structural conditions encountered by baghouse maintenance personnel when installing the tensining devices.

Accordingly, the following additional embodiments of the invention are illustrative of various assembly reversals and substitutions in connection with previously described structures.

Figure 10:
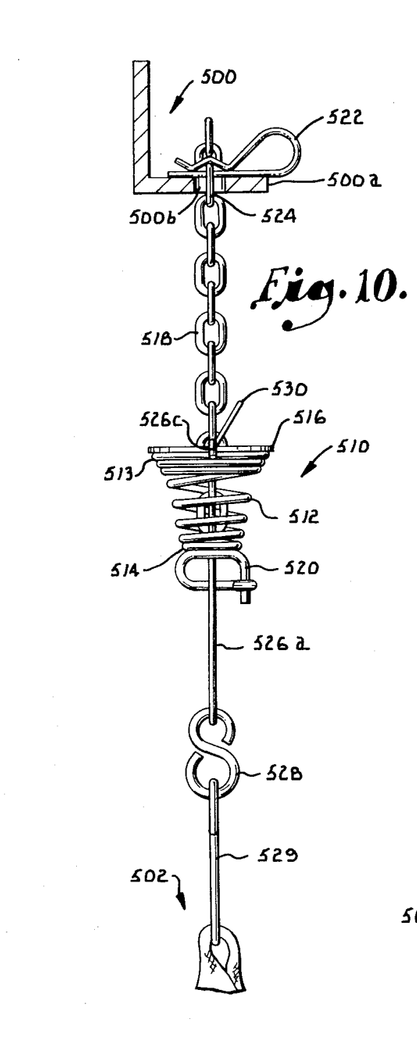
FIG. 10 is a side elevational view of a tensioning device interconnecting the upper end of a filter sleeve with the overhead support framework of a baghouse illustrating the fifth embodiment of the invention.
Figure 11:
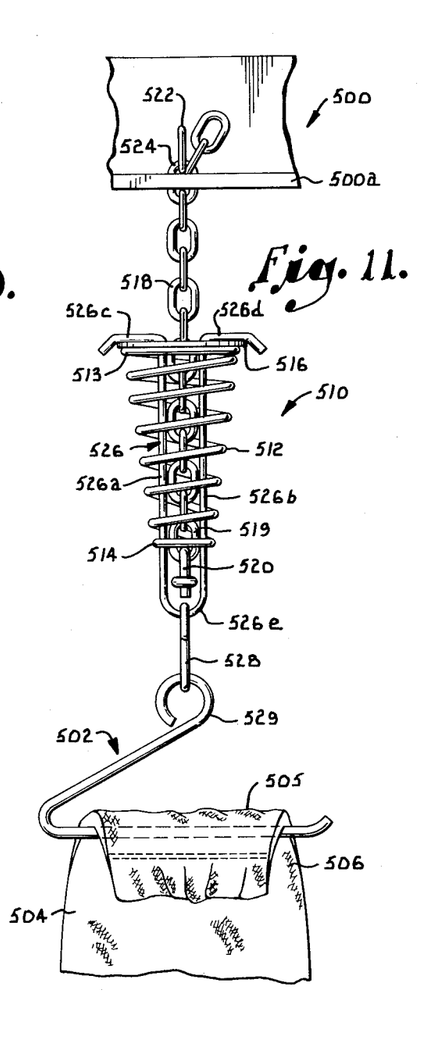
FIG. 11 is a side elevational view taken 90° to the FIG. 10 view and with the retaining spring released to pull taut the fabric filter sleeve.

Referring to the fifth embodiment of the invention shown in FIGS. 10 and 11, there is illustrated an assembly reversal which is analogous to the embodiment of the invention shown in FIGS. 1 and 2. Within the upper region of the clean air plenum is mounted a bag support framework which, as shown, may be constructed of angle iron members 500. The horizontal leg 500a of the angle iron support 500 includes an opening 500b therethrough used for connecting a filter bag to the framework.

Mounted within the clean air plenum are a plurality of filter assemblies, the upper end of one such filter assembly 502 is shown in FIGS. 10 and 11. The lower end of the filter sleeve 504 is securely fixed to a cell plate separating the dirty and clean air plenums. Particulate laden process gas may thus flow from the dirty air plenum, through the cell plate to the interior of the filter sleeve 504.

As illustrated in FIGS. 10 and 11, a spring tensioning assembly 510 is interposed in the connecting linkage between the top of the filter assembly 502 and the overhead support structure 500 characteristically found in a baghouse. Focusing first on the spring tensioning assembly 510 itself, there is included a conical spring 512 having a greater diameter end 513 and a progressively lesser diameter, opposite end 514. Contacting the greater diameter end 513 of the conical spring 512 is a retainer washer 516. The retainer washer 516 is of the same general form as illustrated in FIG. 5 and includes a central slot therethrough. A support chain 538 extends centrally through the conical spring 512 and passes through the central slot in the retainer washer 516. One terminal link 519 of the chain 518 receives a cross bolt or keeper link 520 which forms a first spring biasing surface.

The support chain 518 passes upwardly from the cross bolt or keeper link 520 centrally through the conical spring 512 and through the opening 500b in the overhead support 500a where it is secured by a hitch pin clip 522 passed through one link (i.e., link 524) of the chain 518.

Thus, the chain 518, keeper link 520, and pin clip 522 cooperate to provide a frame-to-spring support means interconnecting the spring 512 to the overhead support structure 500.

Also extending centrally through the conical spring 512, on the outside of the support chain 518, is a draw bar 526. The draw bar 526 is in the form of a U-shaped member having legs 526a and 526b which pass through the central slot in the retainer washer 516 and which terminate in outwardly extending ears 526c and 526d which overlie the greater diameter end 513 of the conical spring 512. Contacting the greater diameter end 513 of the conical spring 512 is the retainer washer 516 which provides a second spring biasing surface. The bight end 526e of the draw bar 526 carries a chain or S-hook 528 connected to a hanger 529, together forming a chain member, which receives the fabric loop 505 of the filter sleeve 504 having a tapered upper end 506 well known to those in this industry.

Thus, the retainer washer 516, draw bar 526, S-hook 528, and hanger 529 cooperate to provide a bag-to-spring support means interconnecting the upper end 506 of the filter to the spring 512.

In the pretensioned condition of the spring assembly 510 illustrated in FIG. 10, prior to completed installation of the filter assembly, the conical spring 512 is compressed between the first and second spring biasing surfaces provided respectively by the cross bolt or keeper link 520 and the retainer washer 516. The conical spring 512 is captured in the foregoing position by a hitch pin clip 530 through one of the links of support chain 518 to retainingly engage the greater diameter end 513 of the spring 512.

In operation, the lower end of the filter sleeve 504 is secured in a conventional manner to the cell plate in the bottom region of the baghouse. The upper end of the filter sleeve is connected to the spring tensioning assembly 510 as indicated with the conical spring 512 captured between the first and second spring biasing surfaces. The tag end of the support chain 518 is inserted through the opening 500b in the overhead support 500a and the clip 522 is installed through a link 524 of the chain to suspend the entire filter assembly 502 from the support structure in a pretensioned condition. The pin clip 530 is then removed from the chain 518 to release the conical spring 512. The spring 518 acts against the cross bolt or keeper link 520 and the retainer washer 516 to provide opposing forces to spread apart the first and second spring biasing surfaces and, thus, to tension the filter sleeve 504 as appropriate to complete installation as illustrated in FIG. 11.

Figure 12:
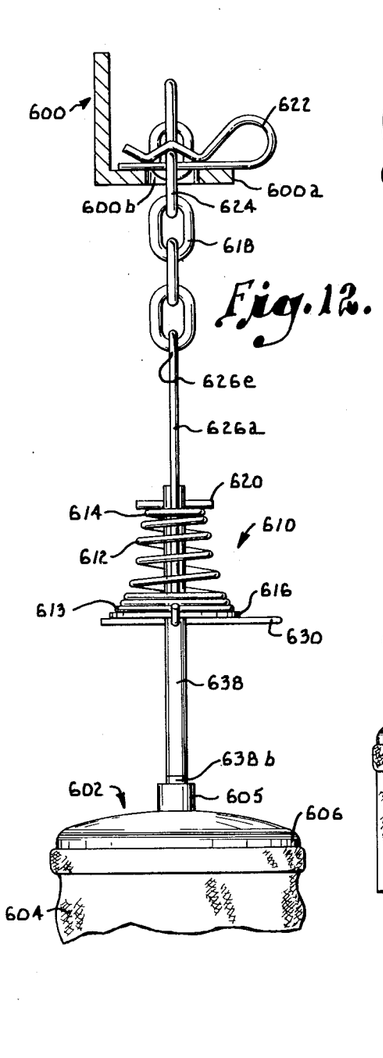
FIG. 12 is a side elevational view of a sixth embodiment of the invention.
Figure 13:
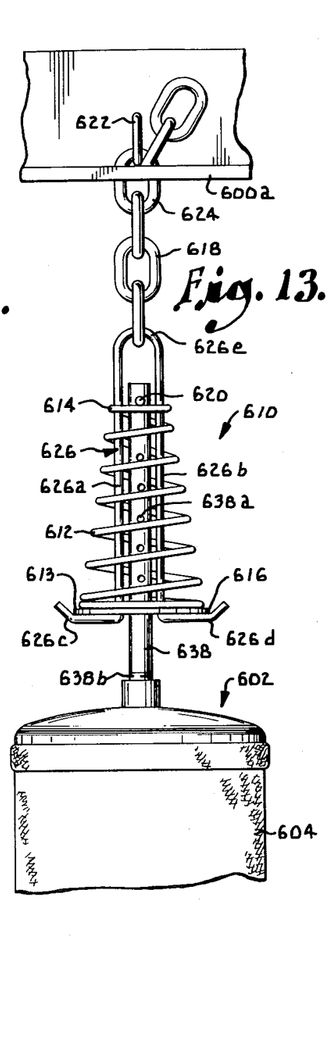
FIG. 13 is a side elevational view taken 90° to the FIG. 12 view and with the retaining spring released to pull taut the fabric filter sleeve.

Referring to the sixth embodiment of the invention shown in FIGS. 12 and 13, there is illustrated an assembly reversal which is analogous to the embodiment of the invention shown in FIGS. 3 and 4. Within the upper region of the clean air plenum is mounted a bag support framework which, as shown, may be constructed of angle iron members 600. The horizontal leg 600a of the angle iron support 600 includes an opening 600b therethrough used for connecting a filter bag to the framework.

Mounted within the clean air plenum are a plurality of filter assemblies, the upper end of one such filter assembly 602 is shown in FIGS. 12 and 13. The lower end of the filter sleeve 604 is securely fixed to a cell plate separating the dirty and clean air plenums. Particulate laden process gas may thus flow from the dirty air plenum, through the cell plate to the interior of the filter sleeve 604.

As illustrated in FIGS. 12 and 13, a spring tensioning assembly 610 is interposed in the connecting linkage between the top of the filter assembly 602 and the overhead support structure 600 characteristically found in a baghouse. Focusing first on the spring tensioning assembly 610 itself, there is included a conical spring 612 having a greater diameter end 613 and a progressively lesser diameter, opposite end 614. Contacting the greater diameter end 613 of the conical spring 612 is a retainer washer 616. The retainer washer 616 is of the same general form as illustrated in FIG. 5 and includes a central slot therethrough. A support rod 638 having a plurality of lateral holes 638a therethrough extends centrally through the conical spring 612. One end of the rod 638 passes through the central slot in the retainer washer 616 and a rolled pin 620 is inserted in the outermost hole 638a of the rod 638 which forms the first spring biasing surface.

Also extending centrally through the conical spring 612, on the outside of the support rod 638, is a draw bar 626. The draw bar 626 is in the form of a U-shaped member having legs 626a and 626b which pass through the central slot in the retainer washer 616 and which terminate in outwardly extending ears 626c and 626d which overlie the greater diameter end 613 of the conical spring 612. Contacting the greater diameter end 613 of the conical spring 612 is the retainer washer 616 which provides a second spring biasing surface. A support chain 618 extends upwardly from the bight 626e of the draw bar 626 and through the opening 600b in the overhead support 600a where it is secured by a hitch pin clip 622 passed through one link (i.e., link 624) of the chain 618.

The lower threaded end 638b of the support rod 638 is received by a female threaded coupler 605 fixed to a rigid end closure cap 606. Alternatively, the threaded end of the support rod may penetrate a hole in the cap 606 and be secured interiorly thereof by a nut or the like. The uppermost end of the filter sleeve is secured to the cap 606 in a manner commonly known in this art.

Thus, the rod 638 and pin 620 cooperate to provide a bag-to-spring support means interconnecting the spring 612 to the filter assembly 602. Moreover, the retainer washer 616, draw bar 626, chain 618, and pin 622 cooperate to provide a frame-to-spring support means interconnecting the spring 612 to the overhead support structure 600.

In the pretensioned condition of the spring assembly 610 illustrated in FIG. 12, prior to completed installation of the filter assembly, the conical spring 612 is compressed between the first and second spring biasing surfaces provided respectively by the rolled pin 620 and the retainer washer 616. The conical spring 612 is captured in the foregoing position by a pin member 630 through one of the holes 638a of support rod 638 to retainingly engage the greater diameter end 613 of the spring 612.

In operation, the lower end of the filter sleeve 604 is secured in a conventional manner to the cell plate in the bottom region of the baghouse. The upper end of the filter sleeve is connected to the spring tensioning assembly 610 as indicated with the conical spring 612 captured between the first and second spring biasing surfaces. The tag end of the support chain 618 is inserted through the opening 600b in the overhead support 600a and the clip 622 is installed through a link 624 of the chain to suspend the entire filter assembly 602 from the support structure in a pretensioned condition. The pin member 630 is then removed from the rod 638 to release the conical spring 612. The spring 612 acts against the rolled pin 620 and the retainer washer 616 to provide opposing forces to spread apart the first and second spring biasing surfaces and, thus, to tension the filter sleeve 604 as appropriate to complete installation as illustrated in FIG. 13.

Figure 14:
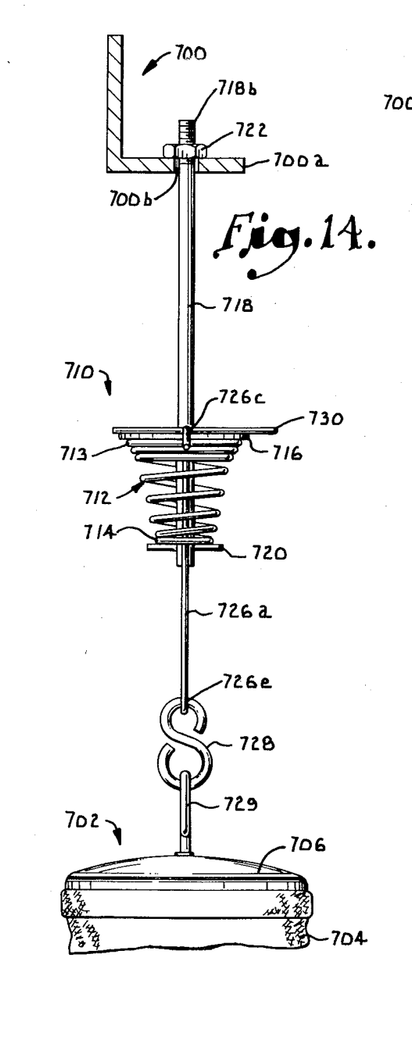
FIG. 14 is a side elevational view of a seventh embodiment of the invention.
Figure 15:
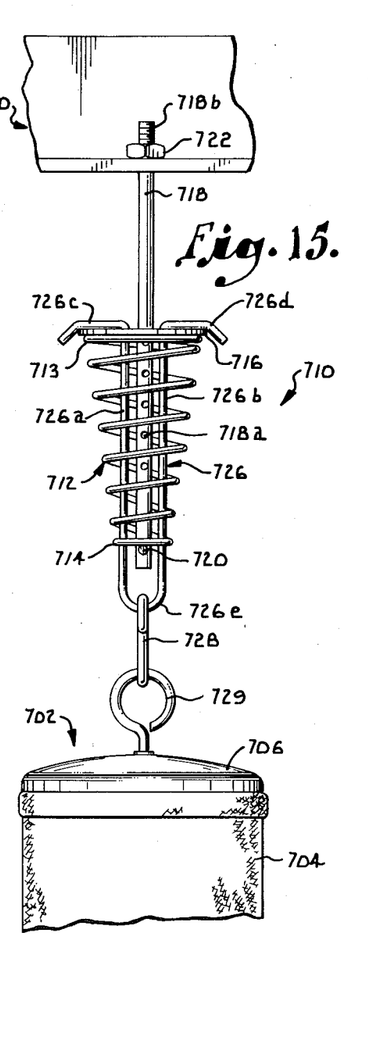
FIG. 15 is a side elevational view taken 90° to the FIG. 14 view and with the retaining spring released to pull taut the fabric filter sleeve.

Referring to the seventh embodiment of the invention shown in FIGS. 14 and 15, there is illustrated an assembly reversal which is analogous to the embodiment of the invention shown in FIGS. 6 and 7. Within the upper region of the clean air plenum is mounted a bag support framework which, as shown, may be constructed of angle iron members 700. The horizontal leg 700a of the angle iron support 700 includes an opening 700b therethrough used for connecting a filter bag to the framework.

Mounted within the clean air plenum are a plurality of filter assemblies, the upper end of one such filter assembly 702 is shown in FIGS. 14 and 15. The lower end of the filter sleeve 704 is securely fixed to a cell plate separating the dirty and clean air plenums. Particulate laden process gas may thus flow from the dirty air plenum, through the cell plate to the interior of the filter sleeve 704.

As illustrated in FIGS. 14 and 15, a spring tensioning assembly 710 is interposed in the connecting linkage between the top of the filter assembly 702 and the overhead support structure 700 characteristically found in a baghouse. Focusing first on the spring tensioning assembly 710 itself, there is included a conical spring 712 having a greater diameter end 713 and a progressively lesser diameter, opposite end 714. Contacting the greater diameter end 713 of the conical spring 712 is a retainer washer 716. The retainer washer 716 is of the same general form as illustrated in FIG. 5 and includes a central slot therethrough. A support rod 718 having a plurality of lateral holes 718a therethrough extends centrally through the conical spring 712. One end of the rod 718 passes through the central slot in the retainer washer 716 and a rolled pin 720 is inserted in the outermost hole 718a of the rod 718 to form the first spring biasing surface.

The support rod 718 passes upwardly from the rolled pin 720 centrally through the conical spring 712 and through the opening 700b in the overhead support 700a where it is secured by a nut 722 on the threaded upper end 718b of the rod 718. Alternatively, a speed nut or friction grippers may be used to connect the upper end of the rod 718 to the support frame 700.

Thus, the support rod 718, pin 720, and nut 722 cooperate to provide a frame-to-spring support means interconnecting the spring 712 to the overhead support structure 700.

Also extending centrally through the conical spring 712, on the outside of the support rod 718, is a draw bar 726. The draw bar 726 is in the form of a U-shaped member having legs 726a and 726b which pass upwardly through the central slot in the retainer washer 716 and which terminate in outwardly extending ears 726c and 726d which overlie the greater diameter end 713 of the conical spring 712. Contacting the greater diameter end 713 of the conical spring 712 is the retainer washer 716 which provides a second spring biasing surface. The bight end 726e of the draw bar 726 carries an S-hook 728, forming a chain member, which is coupled to an eye-bolt 729 or hook connected to the rigid, end closure cap 706. The cap 706 carries the filter sleeve 704 in a manner common and well known to the industry.

Thus, the retainer washer 716, draw bar 726, S-hook 728, and eye-bolt 729 cooperate to provide a bag-to-spring support means interconnecting the end cap 706 of the filter to the spring 712.

In the pretensioned condition of the spring assembly 710 illustrated in FIG. 14, prior to completed installation of the filter assembly, the conical spring 712 is compressed between the first and second spring biasing surfaces provided respectively by the rolled pin 720 and the retainer washer 716. The conical spring 712 is captured in the foregoing position by a pin member 730 through one of the holes 718a of support rod 718 to retainingly engage the greater diameter end 713 of the spring 712.

In operation, the lower end of the filter sleeve 704 is secured in a conventional manner to the cell plate in the bottom region of the baghouse. The upper end of the filter sleeve is connected to the spring tensioning assembly 710 as indicated with the conical spring 712 captured between the first and second spring biasing surfaces. The upper end of the support rod 718 is inserted through the opening 700b in the overhead support 700a and secured to suspend the entire filter assembly 702 from the support structure in a pretensioned condition. The pin member 730 is then removed from the rod 718 to release the conical spring 712. The spring 712 acts against the rolled pin 720 and the retainer washer 716 to provide opposing forces to spread apart the first and second spring biasing surfaces and, thus, to tension the filter sleeve 704 as appropriate to complete installation as illustrated in FIG. 15.

Figures 16, 17:
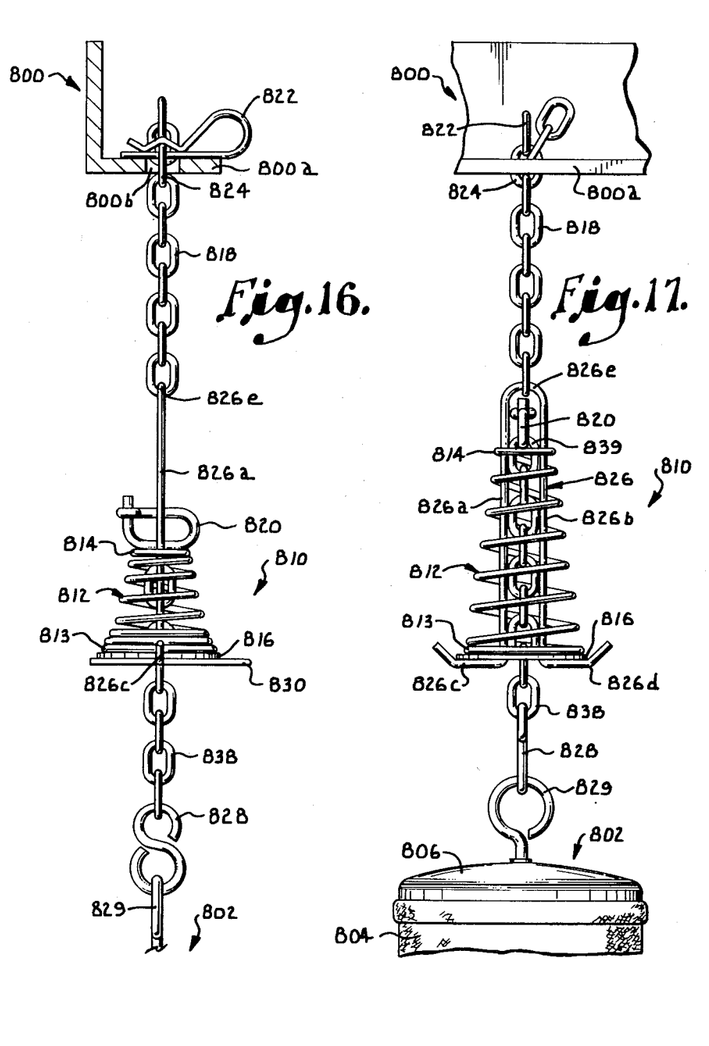
FIG. 16 is a side elevational view of an eighth embodiment of the invention.
FIG. 17 is a side elevational view taken 90° to the FIG. 16 view and with the retaining spring released to pull taut the fabric filter sleeve.

Referring to the eighth embodiment of the invention shown in FIGS. 16 and 17, there is illustrated a substitution of previously disclosed chain assemblies for both the bag-to-spring connection and the frame-to-spring connection. Within the upper region of the clean air plenum is mounted a bag support framework which, as shown, may be constructed of angle iron members 800. The horizontal leg 800a of the angle iron support 800 includes an opening 800b therethrough used for connecting a filter bag to the framework.

Mounted within the clean air plenum are a plurality of filter assemblies, the upper end of one such filter assembly 802 is shown in FIGS. 16 and 17. The lower end of the filter sleeve 804 is securely fixed to a cell plate separating the dirty and clean air plenums. Particulate laden process gas may thus flow from the dirty air plenum, through the cell plate to the interior of the filter sleeve 804.

As illustrated in FIGS. 16 and 17, a spring tensioning assembly 810 is interposed in the connecting linkage between the top of the filter assembly 802 and the overhead support structure 800 characteristically found in a baghouse. Focusing first on the spring tensioning assembly 810 itself, there is included a conical spring 812 having a greater diameter end 813 and a progressively lesser diameter, opposite end 814. Contacting the greater diameter end 813 of the conical spring 812 is a retainer washer 816. The retainer washer 816 is of the same general form as illustrated in FIG. 5 and includes a central slot therethrough. A support chain 838 extends centrally through the conical spring 812. One end of the chain 838 passes through the central slot in the retainer washer 816 and extends through the length of the spring 812. A cross bolt or keeper link 820 is inserted in the tag link 839 of the chain 838 to form the first spring biasing surface.

Also extending centrally through the conical spring 812, on the outside of the support chain 838, is a draw bar 826. The draw bar 826 is in the form of a U-shaped member having legs 826a and 826b which pass through the central slot in the retainer washer 816 and which terminate in outwardly extending ears 826c and 826d which overlie the greater diameter end 813 of the conical spring 812. Contacting the greater diameter end 813 of the conical spring 812 is the retainer washer 816 which provides a second spring biasing surface. A support chain 818 extends upwardly from the bight 826e of the draw bar 826 and through the opening 800b in the overhead support 800a where it is secured by a hitch pin clip 822 passed through one link (i.e., link 824) of the chain 818.

The lowermost end link of the support chain 838 carries an S-hook 828 which is coupled to an eye-bolt 829 or hook connected to the rigid, end closure cap 806. The cap 806 carries the filter sleeve 804 in a manner common and well known to the industry. Alternatively, the S-hook may be coupled to a hangar (not shown) which receives the fabric loop of the filter sleeve having a tapered upper end well known to those in this industry.

Thus, the chain 838, keeper link 820, S-hook 828, and eye-bolt 829 cooperate to provide a bag-to-spring support means interconnecting the spring 812 to the filter assembly 802. Moreover, retainer washer 816, draw bar 826, chain 818, and pin 822 cooperate to provide a frame-to-spring support means interconnecting the spring 812 to the overhead support structure 800.

In the pretensioned condition of the spring assembly 810 illustrated in FIG. 16, prior to completed installation of the filter assembly, the conical spring 812 is compressed between the first and second spring biasing surfaces provided respectively by the cross bolt or keeper link 820 and the retainer washer 816. The conical spring 812 is captured in the foregoing position by a rolled pin 830 through one of the links of the chain 838 to retainingly engage the greater diameter end 813 of the spring 812.

In operation, the lower end of the filter sleeve 804 is secured in a conventional manner to the cell plate in the bottom region of the baghouse. The upper end of the filter sleeve is connected to the spring tensioning assembly 810 as indicated with the conical spring 812 captured between the first and second spring biasing surfaces. The tag end of the support chain 818 is inserted through the opening 800b in the overhead support 800a and the clip 822 is installed through a link 824 of the chain to suspend the entire filter assembly 802 from the support structure in a pretensioned condition. The rolled pin 830 is then removed from the chain 838 to release the conical spring 812. The spring 812 acts against the cross bolt or keeper link 820 and the retainer washer 816 to provide opposing forces to spread apart the first and second spring biasing surfaces and, thus, to tension the filter sleeve 804 as appropriate to complete installation as illustrated in FIG. 17.

Figure 18:
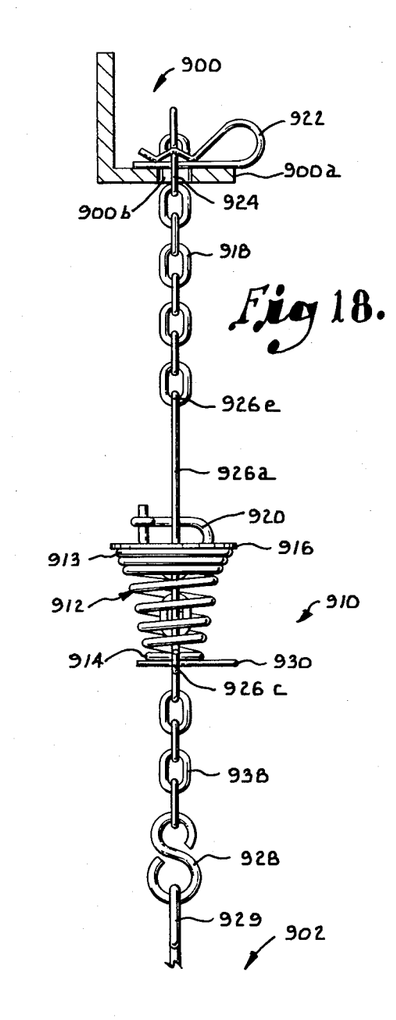
FIG. 18 is a side elevational view of a ninth embodiment of the invention.
Figure 19:
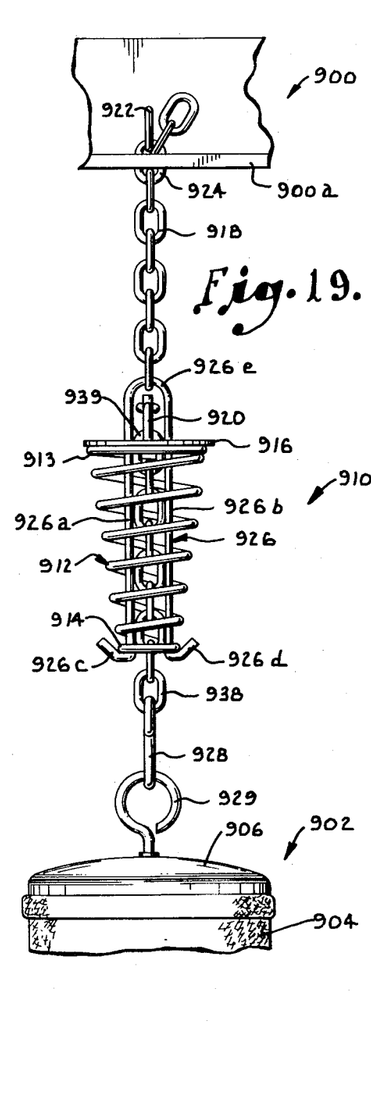
FIG. 19 is a side elevational view taken 90° to the FIG. 18 view and with the retaining spring released to pull taut the fabric filter sleeve.

Referring to the ninth embodiment of the invention shown in FIGS. 18 and 19, there is illustrated as assembly reversal which is analogous to the embodiment of the invention shown in FIGS. 16 and 17. Within the upper region of the clean air plenum is mounted a bag support framework which, as shown, may be constructed of angle iron members 900. The horizontal leg 900a of the angle iron support 900 includes an opening 900b therethrough used for connecting a filter bag to the framework.

Mounted within the clean air plenum are a plurality of filter assemblies, the upper end of one such filter assembly 902 is shown in FIGS. 18 and 19. The lower end of the filter sleeve 904 is securely fixed to a cell plate separating the dirty and clean air plenums. Particulate laden process gas may thus flow from the dirty air plenum, through the cell plate to the interior of the filter sleeve 904.

As illustrated in FIGS. 18 and 19, a spring tensioning assembly 910 is interposed in the connecting linkage between the top of the filter assembly 902 and the overhead support structure 900 characteristically found in a baghouse. Focusing first on the spring tensioning assembly 910 itself, there is included a conical spring 912 having a greater diameter end 913 and a progressively lesser diameter, opposite end 914. Contacting the greater diameter end 913 of the conical spring 912 is a retainer washer 916 which forms a first spring biasing surface. The retainer washer 816 is of the same general form as illustrated in FIG. 5 and includes a central slot therethrough. A support chain 938 extends centrally through the conical spring 912. The tag end link 939 of the chain 938 passes through the central slot in the retainer washer 916 and receives a cross bolt or keeper link 920 to secure the chain 938.

Also extending centrally through the conical spring 912, on the outside of the support chain 938, is a draw bar 926. The draw bar 926 is in the form of a U-shaped member having legs 926a and 926b which pass through the central slot in the retainer washer 916 and which terminate in outwardly extending ears 926c and 926d which overlie the lesser diameter end 914 of the conical spring 912 to provide a second spring biasing surface. A support chain 918 extends upwardly from the bight 926e of the draw bar 926 and through the opening 900b in the overhead support 900a where it is secured by a hitch pin clip 922 passed through one link (i.e., link 924) of the chain 918.

The lowermost end link of the chain 938 carries an S-hook 928 which is coupled to an eye-bolt 929 or hook connected to the rigid, end closure cap 906. The cap 906 carries the filter sleeve 904 in a manner common and well known to the industry. Alternatively, the S-hook may be coupled to a hangar (not shown) which receives the fabric loop of the filter sleeve having a tapered upper end well known to those in this industry.

Thus, the chain 938, retainer washer 916, keeper link 920, S-hook 928, and eye-bolt 929 cooperate to provide a bag-to-spring support means interconnecting the spring 912 to the filter assembly 902. Moreover, the draw bar 926, chain 918, and pin 922 cooperate to provide a frame-to-spring support means interconnecting the spring 912 to the overhead support structure 900.

In the pretensioned condition of the spring assembly 910 illustrated in FIG. 18, prior to completed installation of the filter assembly, the conical spring 912 is compressed between the first and second spring biasing surfaces provided respectively by the retainer washer 916 and the ears 926c and 926d of the draw bar 926. The conical spring 912 is captured in the foregoing position by a rolled pin 930 through one of the links of the support chain 938 to retainingly engage the lesser diameter end 914 of the spring 912.

In operation, the lower end of the filter sleeve 904 is secured in a conventional manner to the cell plate in the bottom region of the baghouse. The upper end of the filter sleeve is connected to the spring tensioning assembly 910 as indicated with the conical spring 912 captured between the first and second spring biasing surfaces. The tag end of the support chain 918 is inserted through the opening 900b in the overhead support 900a and the clip 922 is installed through a link 924 of the chain to suspend the entire filter assembly 902 from the support structure in a pretensioned condition. The rolled pin 930 is then removed from the chain 938 to release the conical spring 912. The spring 912 acts against the retainer washer 916 and the ears 926c and 926d of the draw bar 926 to provide opposing forces to spread apart the first and second spring biasing surfaces and, thus, to tension the filter sleeve 904 as appropriate to complete installation as illustrated in FIG. 19.

Heretofore, a need has existed for an external tensioning device for bag filters. Double draw bars have been utilized but were cumbersome in installation adjustments and could not be preloaded to provide an appropriate tensioning force. The instant invention achieves the goal of providing a preloaded, external tensioning device to appropriately tension bags in a wide variety of structural configurations where overhead room is limited or a limited space between the bag and support framework is indicated. With respect to the latter consideration, shortening of the bags is of course undesirable due to the reduction in filter cloth area. Even where the distance from bag to support is critically short, the preloaded spring assembly utilizing the conical spring which can collapse to a shorter dimension than a conventional spring will permit proper tensioning of the filters.

From the foregoing it will be seen that this invention is one well adapted to attain all end and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described out invention, we claim:

1. In a dust collector having a bag support frame and a cell plate to which is connected one end of a fabric sleeve filter, a self tensioning bag device comprising:

compressible spring means interconnected between said bag support frame and the other end of said fabric sleeve filter opposite said one end connected to said cell plate, said spring means having first and second open ends of preselected diameters, wherein said diameter of said second end of said spring means is larger in diameter than said diameter of said first end of said spring means;

bag-to-spring support means connected to said other end of said fabric sleeve filter to support said filter, said bag-to-spring support means including a spring penetrating portion passing through said diameter of said second end of said spring means, passing interiorly through the length of said spring means, and passing outwardly through said diameter of said first end of said spring means to form a first spring biasing surface larger than said diameter of said first end of said spring;

frame-to-spring support means connected to said bag support frame, said frame-to-spring support means including a spring penetrating portion passing through said diameter of said first end of said spring means, passing interiorly through the length of said spring means adjacent said spring penetrating portion of said bag-to-spring support means, and passing outwardly through said diameter of said second end of said spring means to form a second spring biasing surface larger than said diameter of said second end of said spring means; and removable compression holding means comprising a pin member removably connected to said bag-to-spring support means to capture the spring force of said compressible spring means in a compressed condition between said first and second spring biasing surfaces;

whereby said filter sleeve is suspended from said bag support frame and appropriately tensioned when said removable compression holding means is removed to permit said spring means to linearly act against said first and second spring biasing surfaces in opposing fashion.

2. The dust collector as in claim 1 wherein said spring means comprises a conical spring tapered uniformly from said first end to said second end.

3. The dust collector as in claim 1, said bag-to-spring support means including a pin member of larger dimension than said diameter of said first end of said spring means to bear against said spring means to form said first spring biasing surface.

4. The dust collector as in claim 1, said bag-to-spring support means including a chain member adapted to pass interiorly of said spring means.

5. The dust collector as in claim 1, said frame-to-spring support means including a chain member adapted to pass interiorly of said spring means.

6. The dust collector as in claim 1, said frame-to-spring support means including a retainer member of larger dimension than said diameter of said second end of said spring means to bear against said second end of said spring means to form said second spring biasing surface.

7. The dust collector as in claim 6 said retainer member having a central opening therethrough to movably receive said bag-to-spring support means.

8. In a dust collector having a bag support frame and a cell plate to which is connected one end of a fabric sleeve filter, a self tensioning bag device comprising:

compressible spring means interconnected between said bag support frame and the other end of said fabric sleeve filter opposite said one end connected to said cell plate, said spring means having first and second open ends of preselected diameters, wherein said diameter of said first end of said spring means is larger in diameter than said second end of said spring means;

frame-to-spring support means connected to said bag support frame, said frame-to-spring support means including a spring penetrating portion passing through said diameter of said first end of said spring means, passing interiorly through the length of said spring means adjacent said spring penetrating portion of said bag-to-spring support means, and passing outwardly through said diameter of said second end of said spring means to form a first spring biasing surface larger than said diameter of said second end of said spring means;

bag-to-spring support means connected to said other end of said fabric sleeve filter to support said filter, said bag-to-spring support means including a spring penetrating portion passing through said diameter of said second end of said spring means, passing interiorly through the length of said spring means, and passing outwardly through said diameter of said first end of said spring means to form a second spring biasing surface larger than said diameter of said first end of said spring; and removable compression holding means comprising a pin member removably connected to said frame-to-spring support means to capture the spring force of said compressible spring means in a compressed condition between said first and second spring biasing surfaces;

whereby said filter sleeve is suspended from said bag support frame and appropriately tensioned when said removable compression holding means is removed to permit said spring means to linearly act against said first and second spring biasing surfaces in opposing fashion.

9. The dust collector as in claim 8 wherein said spring means comprises a conical spring tapered uniformly from said first end to said second end.

10. The dust collector as in claim 8, said frame-to-spring support means including a pin member of larger dimension than said diameter of said second end of said spring means to bear against said second end of said spring means to form said first spring biasing surface.

11. The dust collector as in claim 8, said bag-to-spring support means including a chain member adapted to pass interiorly of said spring means.

12. The dust collector as in claim 8, said bag-to-spring support means including a retainer member of larger dimension than said diameter of said first end of said spring means to bear against said first end of said spring means to form said second spring biasing surface.

13. The dust collector as in claim 12, said retainer member having a central opening therethrough to movably receive said frame-to-spring support means.

* * * * *